US009251839B1

(12) United States Patent
Agness et al.

(10) Patent No.: US 9,251,839 B1
(45) Date of Patent: Feb. 2, 2016

(54) DATA STORAGE DEVICE WITH OVERVOLTAGE PROTECTION

(71) Applicant: Western Digital Technologies, Inc., Irvine, CA (US)

(72) Inventors: John R. Agness, Laguna Hills, CA (US); William K. Laird, Corona, CA (US); Henry S. Ung, Tustin, CA (US); Andre Pratama, Tustin, CA (US); Ronald G. Gayler, Newport Beach, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/040,426

(22) Filed: Sep. 27, 2013

Related U.S. Application Data

(60) Provisional application No. 61/827,119, filed on May 24, 2013.

(51) Int. Cl.
*G11B 21/02* (2006.01)
*G11B 15/46* (2006.01)
*G11B 19/20* (2006.01)

(52) U.S. Cl.
CPC ............... *G11B 15/46* (2013.01); *G11B 19/20* (2013.01); *G11B 19/2063* (2013.01); *G11B 19/2081* (2013.01)

(58) Field of Classification Search
CPC ....... G06F 1/30; G06F 1/3206; G06F 1/3237; G06F 1/3268; G06F 1/3296; G06F 1/325; G06F 1/3287; G06F 1/3246; G06F 1/3256; G11B 19/00; G11B 19/2081; G11B 7/0946; G11B 33/12; G11B 7/1263; G11B 15/46; G11B 19/20; G11B 19/2063; G11B 20/2081; Y02B 60/1221; Y02B 60/1246; A01B 12/006
See application file for complete search history.

(56) References Cited

U.S. PATENT DOCUMENTS

| | | | |
|---|---|---|---|
| 4,400,711 A | 8/1983 | Avery | |
| 4,484,244 A | 11/1984 | Avery | |
| 5,293,082 A | 3/1994 | Bathaee | |
| 5,930,096 A | 7/1999 | Kim | |
| 6,728,084 B2 | 4/2004 | Ziemer et al. | |
| 6,934,135 B1 | 8/2005 | Ryan | |
| 7,154,725 B2 | 12/2006 | Chloupek et al. | |
| 7,352,159 B2 | 4/2008 | Luo et al. | |
| 7,369,350 B2 | 5/2008 | Yang | |
| 7,733,712 B1 | 6/2010 | Walston et al. | |
| 8,392,077 B1 * | 3/2013 | Kanzaki et al. | 701/51 |
| 2006/0221778 A1 * | 10/2006 | Nakamura et al. | 369/30.01 |
| 2010/0332858 A1 * | 12/2010 | Trantham et al. | 713/300 |
| 2011/0188146 A1 | 8/2011 | Oh et al. | |
| 2011/0266982 A1 | 11/2011 | Rollman | |
| 2012/0026622 A1 * | 2/2012 | Shitara et al. | 360/31 |

(Continued)

Primary Examiner — Dionne Pendleton

(57) ABSTRACT

A data storage device coupled to a host power supply is disclosed and includes a spindle motor and Voice Coil Motor (VCM) circuitry, a power device coupled to the host power supply via a first host supply line and coupled to the spindle motor and VCM circuitry, wherein the power device comprises a first voltage rail, a first isolation circuit, and control circuitry, wherein the power device receives a first supply voltage on the first voltage rail via the first host supply line and provides the first supply voltage to the spindle motor and VCM circuitry via the first isolation circuit, and wherein the control circuitry is operable to monitor the first voltage rail for an overvoltage event and, when the overvoltage event is detected, control the first isolation circuit to disconnect the spindle motor and VCM circuitry from the first voltage rail.

40 Claims, 11 Drawing Sheets

(56) References Cited

U.S. PATENT DOCUMENTS

2012/0151162 A1* 6/2012 Trantham et al. ............ 711/161
2012/0194953 A1 8/2012 Mikolajczak
2012/0286756 A1 11/2012 Tsukiji et al.

* cited by examiner

DATA STORAGE DEVICE WITH OVERVOLTAGE PROTECTION

CROSS REFERENCE TO RELATED APPLICATION

This application claims priority to U.S. Provisional Application No. 61/827,119, filed May 24, 2013, for "DATA STORAGE DEVICE WITH OVERVOLTAGE PROTECTION", which is incorporated herein by reference.

BACKGROUND

Data storage devices, such as disk drives, hybrid drives, and solid state drives, may receive power from a host power supply, which can reside in a desktop or laptop computer or be a standalone power supply, for example. The host power supply typically receives its power from an AC power line. However, if voltage transients occur on the AC power line and the host power supply is not designed sufficiently well, the data storage device to which it is connected may be subjected to an overvoltage event, which may cause damage to the device and/or corruption of data stored therein.

Also, a data storage device may share a host power supply with one or more other products. As a result, a load transient may cause the supply voltage from the host power supply to go out of regulation, thereby causing an undesirable overvoltage event. Thus, it is important to provide overvoltage protection for data storage devices.

DETAILED DESCRIPTION

Some embodiments of the present disclosure are directed to providing overvoltage protection in a data storage device (e.g., a disk drive, a hybrid drive comprising rotating media and non-volatile semiconductor memory, or a solid state drive). In some embodiments, an isolation circuit provided inside a power device in the data storage device, or an isolation circuit provided inside a power device and one or more isolation circuits provided outside the power device are utilized for overvoltage protection, wherein the isolation circuits provided outside the power device are situated in host low voltage and/or host high voltage supply lines. In some embodiments, host low voltage and/or host high voltage supply lines and high voltage and/or low voltage rails inside the power device are monitored by control circuitry in the power device to detect an overvoltage event. In some embodiments, the control circuitry uses one or more Analog to Digital Converter (ADC) channels inside the power device for supply voltage monitoring and overvoltage event detection.

While various embodiments are described herein, these embodiments are presented by way of example only, and not intended to limit the scope of protection. Indeed, the novel methods and devices described herein may be embodied in a variety of other forms. Furthermore, various omissions, substitutions and changes in the form of the methods and devices described herein may be made without departing from the scope of protection. It is noted that 5V is used as an example of a low voltage and 12V is used as an example of a high voltage to illustrate various embodiments described herein. However, in other embodiments, a low voltage greater than or less than 5V and/or a high voltage greater than or less than 12V may be used. To illustrate some of the embodiments, reference will now be made to the figures.

Figure 1:
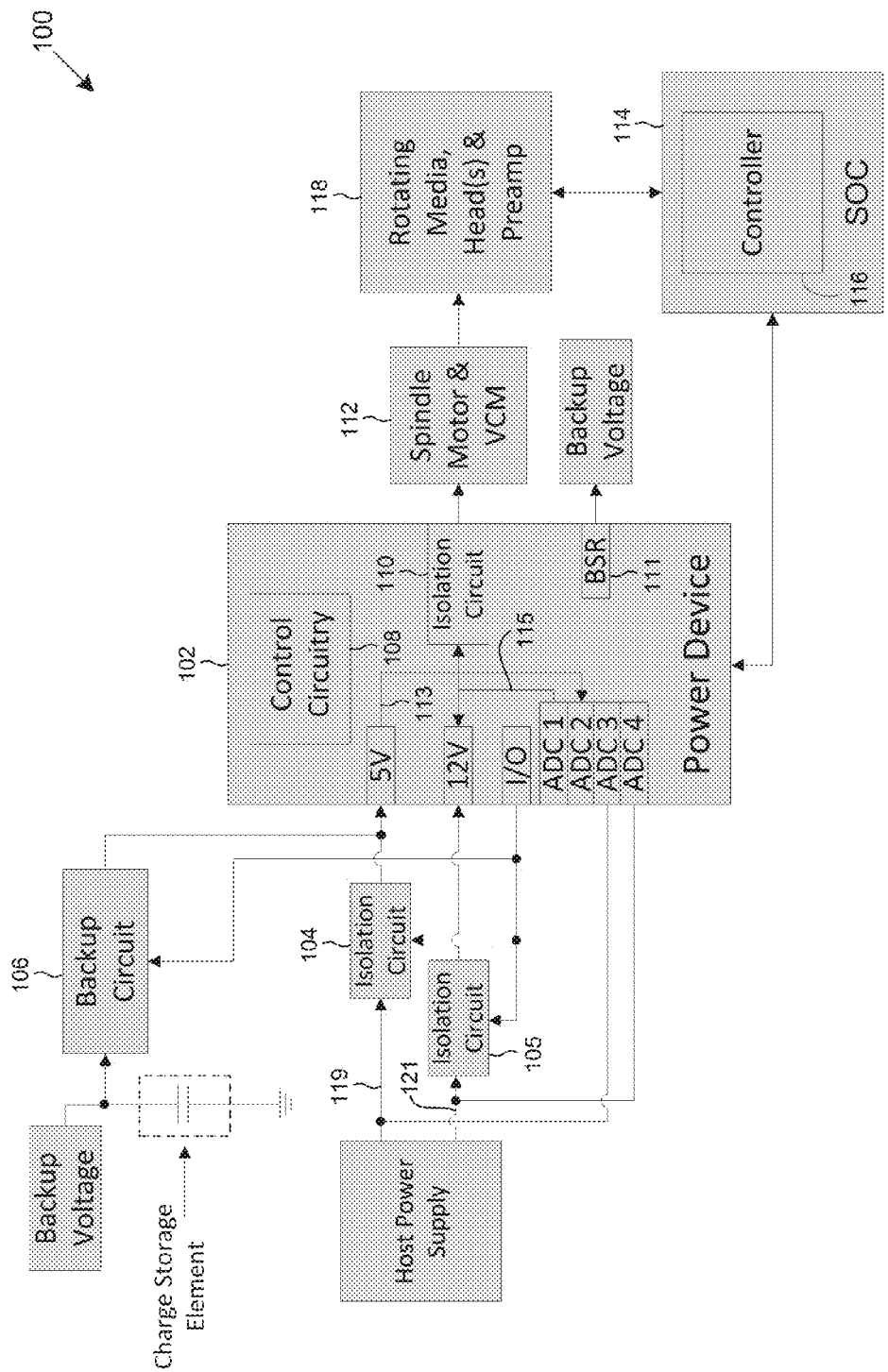
FIG. 1 shows data storage device according to an embodiment of the invention wherein isolation circuits are provided in host low and high voltage supply lines coupled to a power device in the data storage device and a high voltage isolation circuit is provided inside the power device.

FIG. 1 shows a data storage device 100 coupled to a host power supply according to an embodiment of the invention. As shown in FIG. 1, data storage device 100 (e.g., a disk drive, hybrid hard drive, etc.) includes a power device 102, isolation circuits 104 and 105, backup circuit 106, a charge storage element (e.g., a capacitor), spindle motor and voice coil motor (VCM) circuitry 112, a System On a Chip (SOC) comprising a controller 116, and rotating media, head(s) and preamp 118. The rotating media 118 can comprise, for example, one or more disks for storing data. In the embodiment shown in FIG. 1, isolation circuits 104, 105, and 110 may each comprise, for example, an eFuse, a FET (e.g., an ISOFET), or a load switch. In the embodiment in FIG. 1, the data storage device comprises one or more heads 118 for reading and writing data to the rotating media.

Power device 102 includes control circuitry 108, isolation circuit 110, an I/O port, ADC channels 1, 2, 3, and 4, a boost switching regulator (BSR) 111, a low voltage rail 113, and a high voltage rail 115. In one embodiment, the power device 102 is a power Application Specific Integrated Circuit (ASIC). In one embodiment, the data storage device does not include isolation circuit 105. In another embodiment, the power device 102 does not include isolation circuit 110. In one embodiment, backup circuit 106 may comprise, for example, an eFuse, a FET (e.g., an ISOFET), or a load switch. In one embodiment, backup circuit 106 may comprise voltage regulation circuitry for reducing a higher voltage (which may be, for example, greater than 12V) on the charge storage element to a lower voltage (e.g., 5V) which may be provided as a backup voltage on the low voltage rail 113 when the backup circuit 106 is activated by the control circuitry 108.

In the embodiment shown in FIG. 1, the controller 116 is in communication with the power device 102 and the rotating media, head(s) and preamp 118 and controls data read and write operations in the data storage device 100. As shown in FIG. 1, isolation circuit 104 is situated between the host power supply and the power device 102 in a low voltage (e.g., 5V) host supply line 119 and isolation circuit 105 is situated between the host power supply and the power device 102 in a high voltage (e.g., 12V) host supply line 121.

During a normal operating mode, the host power supply provides low (e.g., 5V) and high (e.g., 12V) supply voltages via low voltage and high voltage host supply lines 119 and 121 to the power device 102 via isolation circuits 104 and 105, respectively. During the normal operating mode, isolation circuits 104 and 105 are controlled by the control circuitry 108 to be in an open state to allow the respective low and high supply voltages to pass through to the low and high voltage rails 113 and 115 in the power device 102. In the embodiment shown in FIG. 1, the control circuitry 108 is configured to monitor the low and high voltage host supply lines 119 and 121 from the host power supply prior to the isolation circuits 104 and 105 via ADC channels 3 and 4 and monitor the low and high voltage rails 113 and 115 in the power device 102 via ADC channels 2 and 1, respectively. It is noted that although the various embodiments illustrated in this disclosure use ADC channels for voltage monitoring, other monitoring mechanisms or circuits may be used in other embodiments for voltage monitoring.

During the normal operating mode, isolation circuit 110 is controlled by the control circuitry 108 to be in an open state to allow the high voltage (e.g., 12V) to pass through to the spindle motor and VCM circuitry 112. Also, during normal operation, the BSR 111 is configured to generate a backup voltage (which can be, for example, greater than 12V) to charge the charge storage element. In the embodiment shown in FIG. 1, backup circuit 106 is controlled by the control circuitry 108 to be in an open state during normal operation to isolate the backup voltage on the charge storage element from the low voltage power rail 113 in the power device 102.

When the control circuitry 108 detects an overvoltage event on either the low or high voltage host supply lines via ADC channels 3 or 4, respectively, the control circuitry 108 is configured to open the isolation circuits 104 and 105, thereby isolating the low and high voltage host supply lines 119 and 121 from the respective low and high voltage rails 113 and 115 in the power device 102. For example, by isolating the low voltage host supply line 119 from the power device 102, an overvoltage event on the low voltage host supply line 119 is prevented from damaging the preamp 118 which receives power from the low voltage rail 113.

In one embodiment, an overvoltage event is detected when the supply voltage on the low voltage (e.g., 5V) host supply line 119 exceeds a low voltage threshold or the supply voltage on the high voltage (e.g., 12V) host supply line 121 exceeds a high voltage threshold. When the overvoltage event is detected, the control circuitry 108 is configured to open isolation circuit 110 to disconnect the high voltage rail 115 from the spindle motor and VCM circuitry 112. By doing so, the spindle motor and VCM circuitry 112 are protected from damage which might cause the one or more heads in the data storage device 100 to land on the rotating media and cause data corruption.

When the overvoltage event is detected and isolation circuits 104 and 105 are opened to disconnect the low and high voltage host supply lines 119 and 121 from the power device 102, the control circuitry 108 is further configured to open the backup circuit 106 via a signal from an I/O port to allow the charge storage element to provide a backup voltage on the low voltage rail 113 in the power device 102. The backup voltage enables the control circuitry 108 to continue to monitor the low and high voltage host supply lines 119 and 121 via respective ADC channels 3 and 4 and close isolation circuits 104, 105, and 110 when the control circuitry 108 determines that the overvoltage event has ended and the low and high supply voltages are at operational levels (i.e., levels that are sufficient to enable the data storage device 100 to operate). In one embodiment, when the overvoltage event is detected, the control circuitry 108 is configured to provide an interrupt to the controller 116 in the SOC 114 to notify it that a power fail condition has occurred.

In an embodiment, during the overvoltage event the backup voltage on the low voltage rail 113 also provides power to the preamp and the SOC to enable the controller 116 to finish any on-going writing of data to a sector on the rotating media, and enable the control circuitry 108 to initiate a VCM retract procedure to move the one or more heads off the rotating media (i.e., park the heads) and brake the spindle motor. In one embodiment, the control circuitry 108 is configured to determine if the overvoltage event has ended and the low and high voltage host supply voltages are at operational levels, and if so, close isolation circuits 104, 105, and 110, spin up the rotating media (i.e., one or more disks), return the data storage device 100 to normal operation, and resume monitoring of the low and high voltage host supply lines 119 and 121 as described above.

Figure 2:
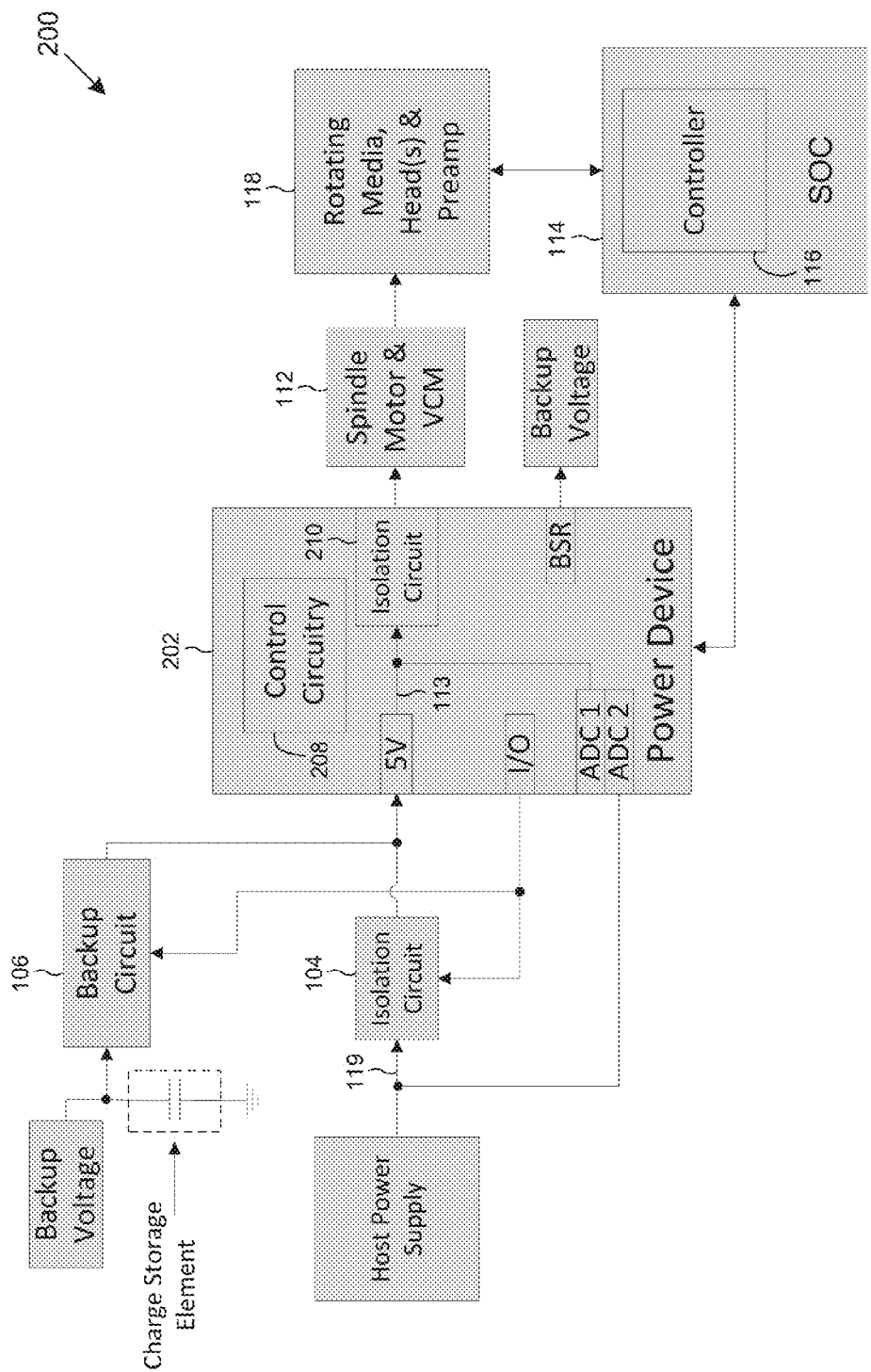
FIG. 2 shows a data storage device according to an embodiment of the invention wherein an isolation circuit is provided in a host low voltage supply line coupled to a power device in the data storage device and a low voltage isolation circuit is provided inside the power device.

FIG. 2 shows a data storage device 200 coupled to a host power supply according to an embodiment of the invention. In the embodiment shown in FIG. 2, the data storage device 200 (e.g., a mobile disk drive or mobile hybrid hard drive) includes a power device 202 that receives only a low supply voltage (e.g., 5V) from the host power supply via the low voltage host supply line 119. During a normal operating mode, the control circuitry 208 in the embodiment shown in FIG. 2 is configured to monitor the low voltage host supply line 119 prior to isolation circuit 104 via ADC channel 2 and monitor the low voltage rail 113 in the power device 202 via ADC channel 1.

In the embodiment shown in FIG. 2, when an overvoltage event is detected by the control circuitry 208, the control circuitry 208 is configured to disconnect the low voltage host supply line 119 from the power device 202 by controlling (opening) the isolation circuit 104 via a signal from the I/O port. The control circuitry 208 also controls (opens) isolation circuit 210 situated inside the power device 202 to disconnect the spindle motor and VCM circuitry 112 from the low voltage rail 113 to protect them from damage that may be caused by the overvoltage event. When the isolation circuit 210 is opened, the control circuitry 208 is also configured to open the backup circuit 106 so as to cause the charge storage element to supply a backup voltage on the low voltage power rail 113 in the power device 202.

The backup voltage on the low voltage rail 113 enables the control circuitry 208 to continue to monitor the low voltage host supply line 119 via ADC channel 2 and close isolation circuits 104 and 210 and backup circuit 106 when the overvoltage event is over and the low host supply voltage is at an operational level (i.e., a level that is sufficient to enable the data storage device 200 to operate). During the overvoltage event, in an embodiment, the backup voltage on the low voltage rail 113 also provides power to the preamp 118 and the SOC 114 to enable the controller 116 to finish any on-going writing of data to a sector on the rotating media, and enable the control circuitry 208 to initiate a VCM retract procedure to move the one or more heads off the rotating media (park the heads) and brake the spindle motor. In one embodiment, the control circuitry 208 is configured to determine if the overvoltage event has ended and the low host supply voltage is at an operational level, and if so, close isolation circuits 104 and 210, spin up the rotating media (i.e., the one or more disks), return the data storage device 200 to normal operation, and resume monitoring the low voltage host supply line 119 as described above.

Figure 3:
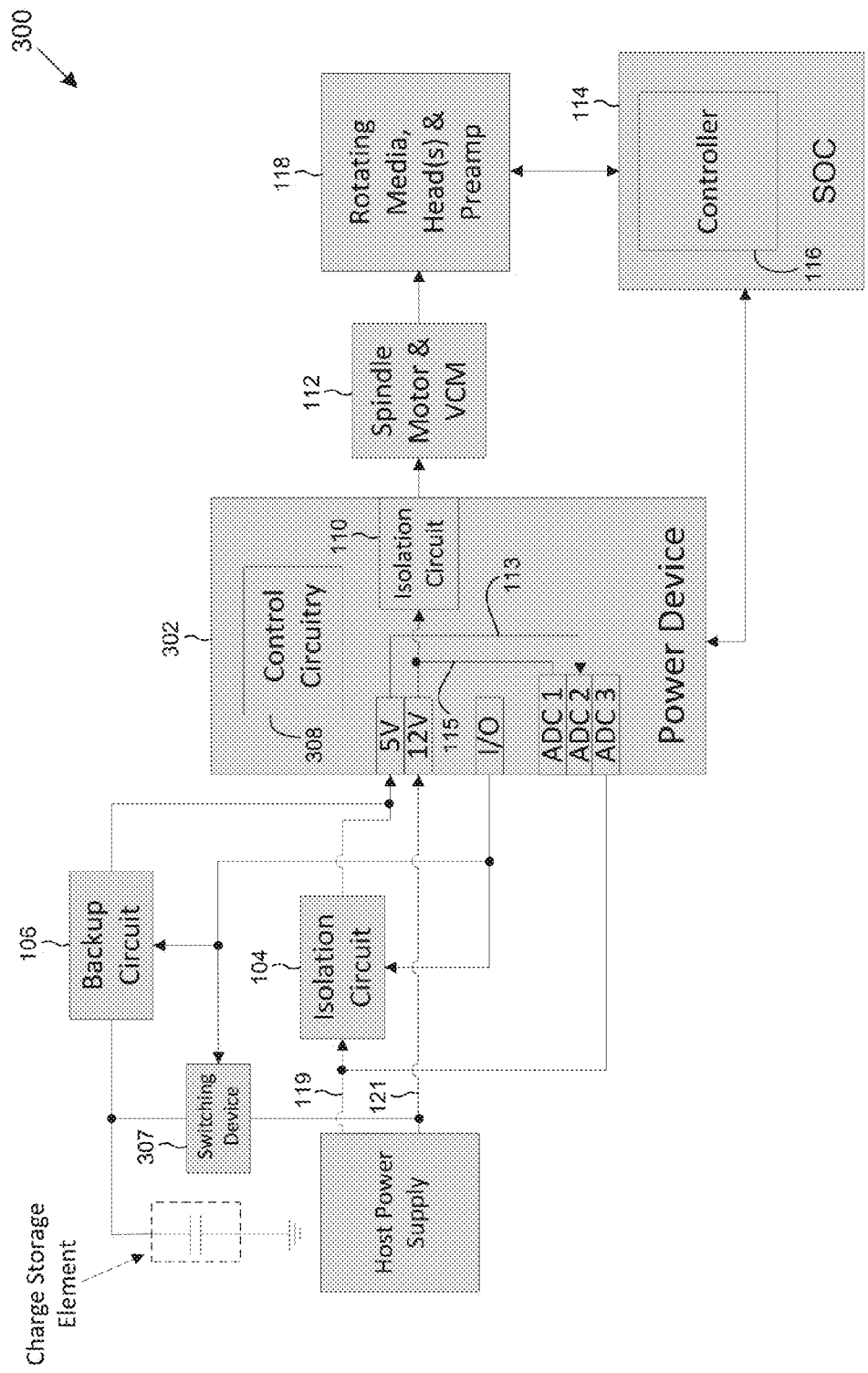
FIG. 3 shows a data storage device according to an embodiment of the invention wherein an isolation circuit is provided in a host low voltage supply line coupled to a power device in the data storage device and a high voltage isolation circuit is provided inside the power device, and wherein a backup circuit is coupled to the host low voltage supply line input of the power device.

FIG. 3 shows a data storage device 300 coupled to a host power supply according to an embodiment of the invention. In contrast to the embodiment of the invention shown in FIG. 1, the power device 302 shown in FIG. 3 does not include a BSR for generating a high voltage for charging the charge storage element. Instead, in the embodiment shown in FIG. 3, the high voltage host supply line 121 is used to charge the charge storage element to the high host supply voltage (e.g., 12V). In one embodiment, the charge storage element may also be charged to the high host supply voltage after isolation circuit 110. Also, in the embodiment in FIG. 3, isolation circuit 105 (shown in FIG. 1) in the high voltage host supply line 121 is not provided; only isolation circuit 110 (inside the power device 302) is used to isolate the spindle motor and VCM circuitry 112 from the high voltage host supply line 121.

In the embodiment shown in FIG. 3, the data storage device 300 includes a switching device 307 coupled between the high voltage host supply line 121 and the charge storage element and the backup circuit 106. Switching device 307 can comprise, for example, a Field Effect Transistor (FET) or other type of transistor or semiconductor device that is configured to operate as a switch. During normal operation of the data storage device 300, the control circuitry 308 is configure to control the switching device 307 (via a signal from the I/O port) to be closed to allow the charge storage element to be charged by the high voltage host supply line 121. During an overvoltage event, the control circuitry 308 is configured to control the switching device 307 to be open, thereby disconnecting (isolating) the charge storage element and the backup circuit 106 from the high voltage host supply line 121.

In the embodiment shown in FIG. 3, during normal operation isolation circuit 104 is controlled by the control circuitry 308 to be in an open state to allow the low supply voltage (e.g., 5V) to pass through to the power device 302, and isolation circuit 110 (inside the power device 302) is controlled by the control circuitry 308 to be in an open state to allow the high supply voltage (e.g., 12V) on the high voltage rail 115 to pass through to the spindle motor and VCM circuitry 112. In the embodiment shown in FIG. 3, the control circuitry 308 is configured to monitor the low voltage line 119 from the host power supply via ADC channel 3 and monitor the low and high voltage rails 113 and 115 in the power device 102 via ADC channels 2 and 1, respectively.

When the control circuitry 308 detects an overvoltage event on either the low or high voltage host power supply lines 119 and 121 via ADC channels 3 or 1, respectively, the control circuitry 308 is configured to open the respective isolation circuits 104 and 110 to isolate the low host supply voltage from the low voltage rail 113 at the low voltage input to the power device 302 and isolate the host high supply voltage from the spindle motor and VCM circuitry 112. By isolating the low host supply voltage from the power device 302, an overvoltage event on the low voltage host supply line 119 is prevented from damaging the preamp in the data storage device 300. When the isolation circuit 110 is opened, the control circuitry 308 is also configured to open the backup circuit 106 so as to cause the charge storage element to supply a backup voltage on the low voltage power rail 113, in a similar manner as discussed above with respect to the embodiments shown in FIG. 1 and FIG. 2.

The backup voltage on the low voltage rail 113 enables the control circuitry 308 to continue to monitor the low voltage host supply line 119 via ADC channel 3 and the high voltage host supply line 121 (which is coupled to the high voltage rail 115) via ADC channel 1 and close isolation circuits 104 and 110 and backup circuit 106 when the control circuitry 308 determines that the overvoltage event is over and the host low and high supply voltages are at operational levels. During the overvoltage event, in an embodiment, the backup voltage on the low voltage rail 113 also provides power to the preamp and the SOC 114 to enable the controller 116 to finish any on-going writing of data to a sector on the rotating media, and enable the control circuitry 308 to initiate a VCM retract procedure to move the one or more heads off the rotating media (park the heads) and brake the spindle motor. In one embodiment, the control circuitry 308 is configured to determine whether the overvoltage event is over and the host low and high supply voltages are at operational levels, and if so, close isolation circuits 104 and 110, spin up the rotating media (i.e., one or more disks), return the data storage device 300 to normal operation, and resume monitoring of the low and high host power supply lines 119 and 121 as described above.

Figure 4:
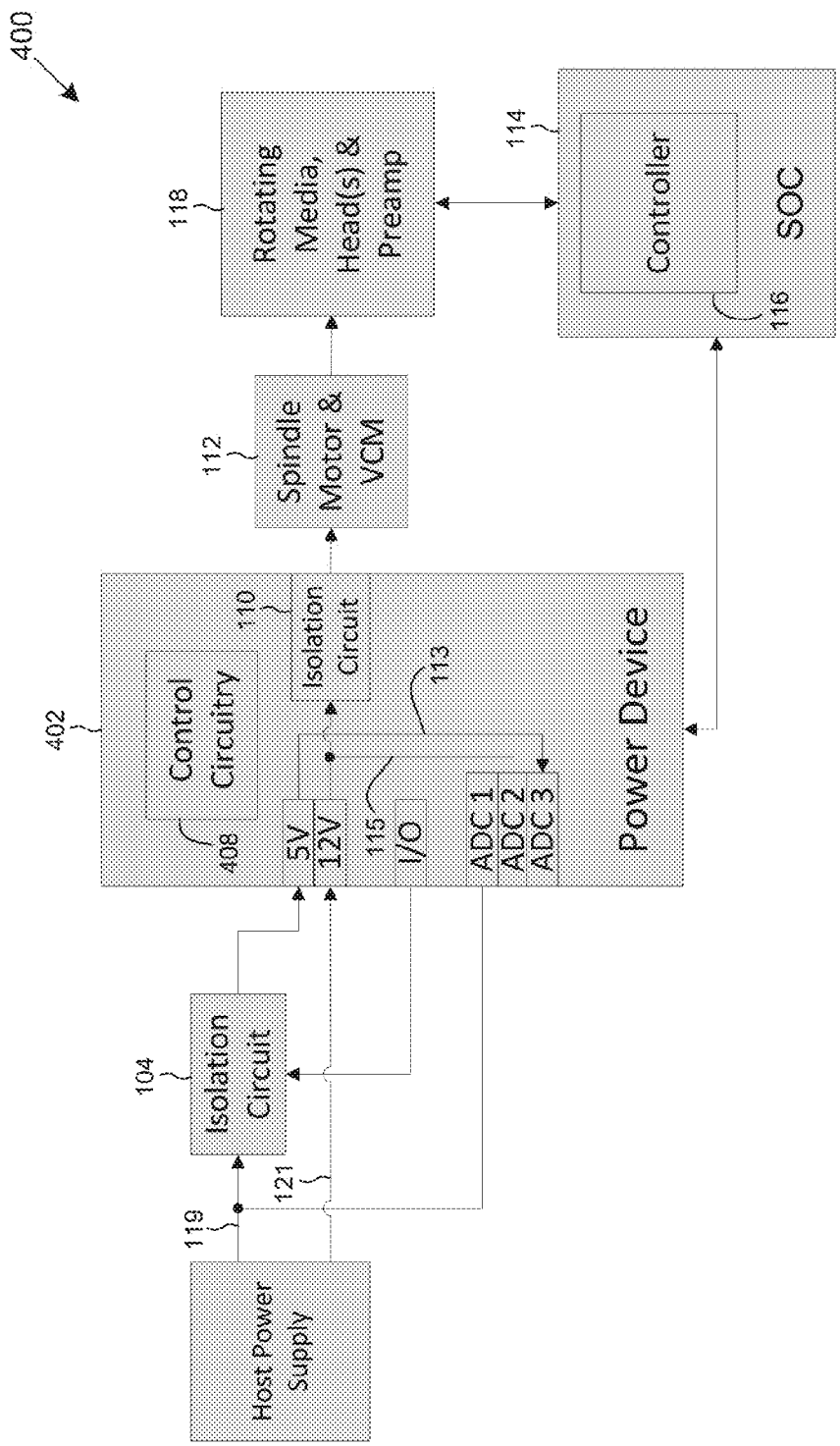
FIG. 4 shows a data storage device according to an embodiment of the invention wherein an isolation circuit is provided in a host low voltage supply line coupled to a power device in the data storage device and a high voltage isolation circuit is provided inside the power device.

FIG. 4 shows a data storage device 400 coupled to a host power supply according to an embodiment of the invention. In contrast to the data storage device 300 shown in FIG. 3, the data storage device 400 shown in FIG. 4 does not include a charge storage element or backup circuit 106. During normal operation, control circuitry 408 in power device 402 in FIG. 4 is configured to monitor the host low and high supply voltages on respective host supply lines 119 and 121 in a similar manner as control circuitry 308 (shown in FIG. 3) discussed above.

In the embodiment shown in FIG. 4, when the control circuitry 408 detects an overvoltage event on either the low or the high voltage host supply line via ADC channels 1 or 2, respectively, the control circuitry 408 is configured to open the isolation circuit 104 to isolate the host low supply voltage from the low voltage rail 113 (which is coupled to the low voltage input) in the power device 402 and open isolation circuit 110 to isolate the host high supply voltage from the spindle motor and VCM circuitry 112. By isolating the low supply voltage from the power device 302, an overvoltage event on the low voltage supply line 119 is prevented from damaging the preamp circuit (in the data storage device 400). During the overvoltage event, the control circuitry 408 is further configured to initiate a VCM retract procedure to move the one or more heads off the rotating media (park the heads) and brake the spindle motor.

In one embodiment, the control circuitry 408 is configured to determine whether the overvoltage event has ended and the host low and high supply voltages are at operational levels, and if so, close isolation circuits 104 and 110, spin up the rotating media (i.e., one or more disks), return the data storage device 400 to normal operation, and resume monitoring of the host low and high voltage host supply lines 119 and 121 as described above.

Figure 5:
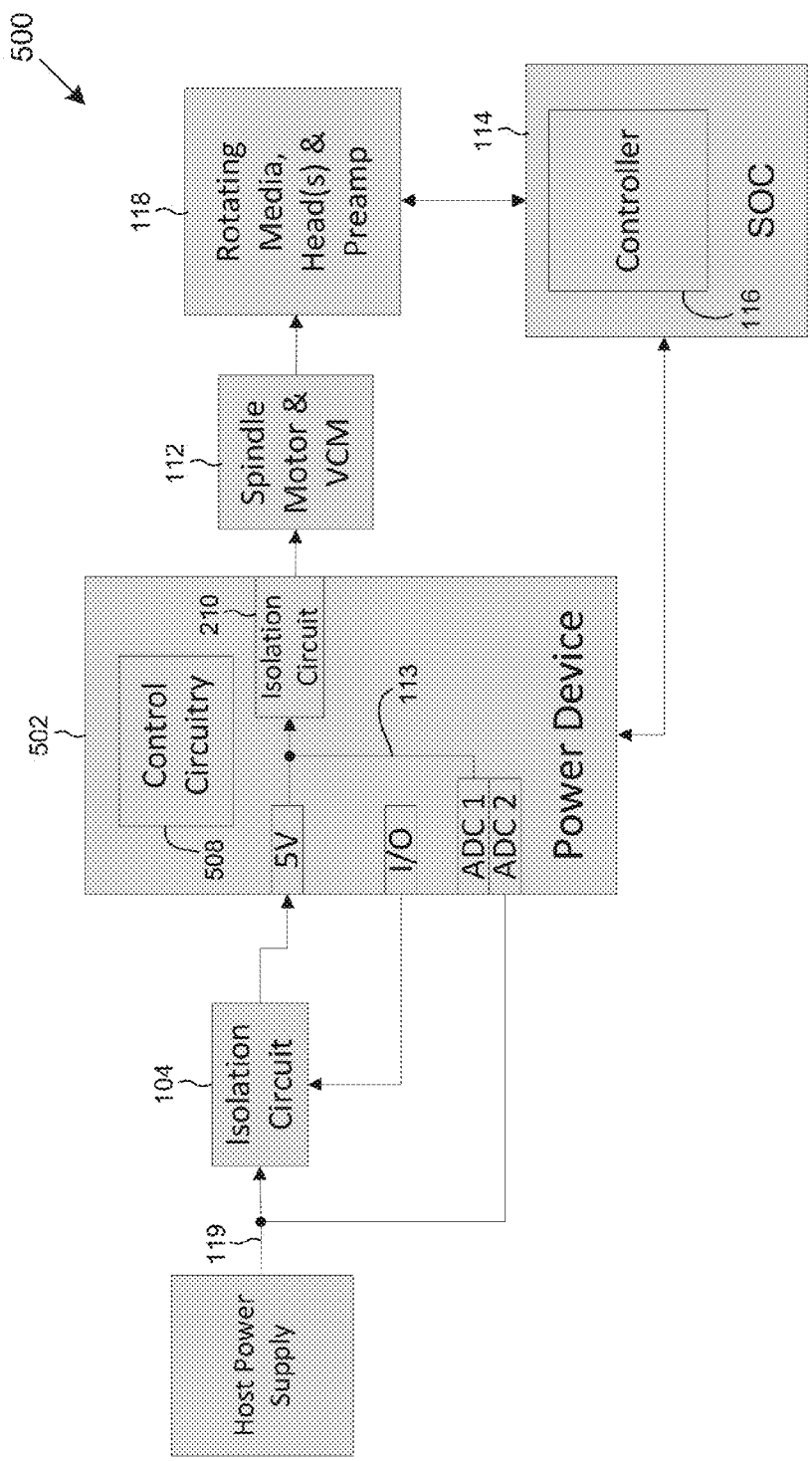
FIG. 5 shows a data storage device according to an embodiment of the invention wherein an isolation circuit is provided in a host low voltage supply line coupled to a power device in the data storage device and a low voltage isolation circuit is provided inside the power device.

FIG. 5 shows a data storage device 500 coupled to a host power supply according to an embodiment of the invention. The embodiment of the invention shown in FIG. 5 is similar to the embodiment of the invention shown in FIG. 2, except that the data storage device 500 in FIG. 5 does not include a charge storage element and backup circuit 106, and power device 502 does not include a BSR. During normal operation, the control circuitry 508 in FIG. 5 is configured to monitor the low voltage host supply line 119 in a similar manner as control circuitry 208 (shown in FIG. 2) discussed above.

When an overvoltage event is detected (i.e., when the host low supply voltage rises above a predetermined threshold), the control circuitry 508 is configured to disconnect the low voltage host supply line 119 from the power device 502 by controlling (i.e., opening) solation circuit 104 via a signal from the I/O port. The control circuitry 508 also opens isolation circuit 210 situated inside the power device 302 to disconnect the spindle motor and VCM circuitry 112 from the low voltage rail 113, thereby protecting them from the overvoltage event.

During the overvoltage event, the control circuitry 508 is also configured to initiate a retraction of the one or more heads from the rotating media (park the heads) and brake the spindle motor. In one embodiment, the control circuitry 508 is configured to determine whether the overvoltage event is over and the host low supply voltage is at an operational level, and if so, close isolation circuits 104 and 210, spin up the rotating media (i.e., one or more disks), return the data storage device 500 to normal operation, and resume monitoring of the low host power supply line 119 as described above in the embodiment of the invention shown in FIG. 2.

Figure 6:
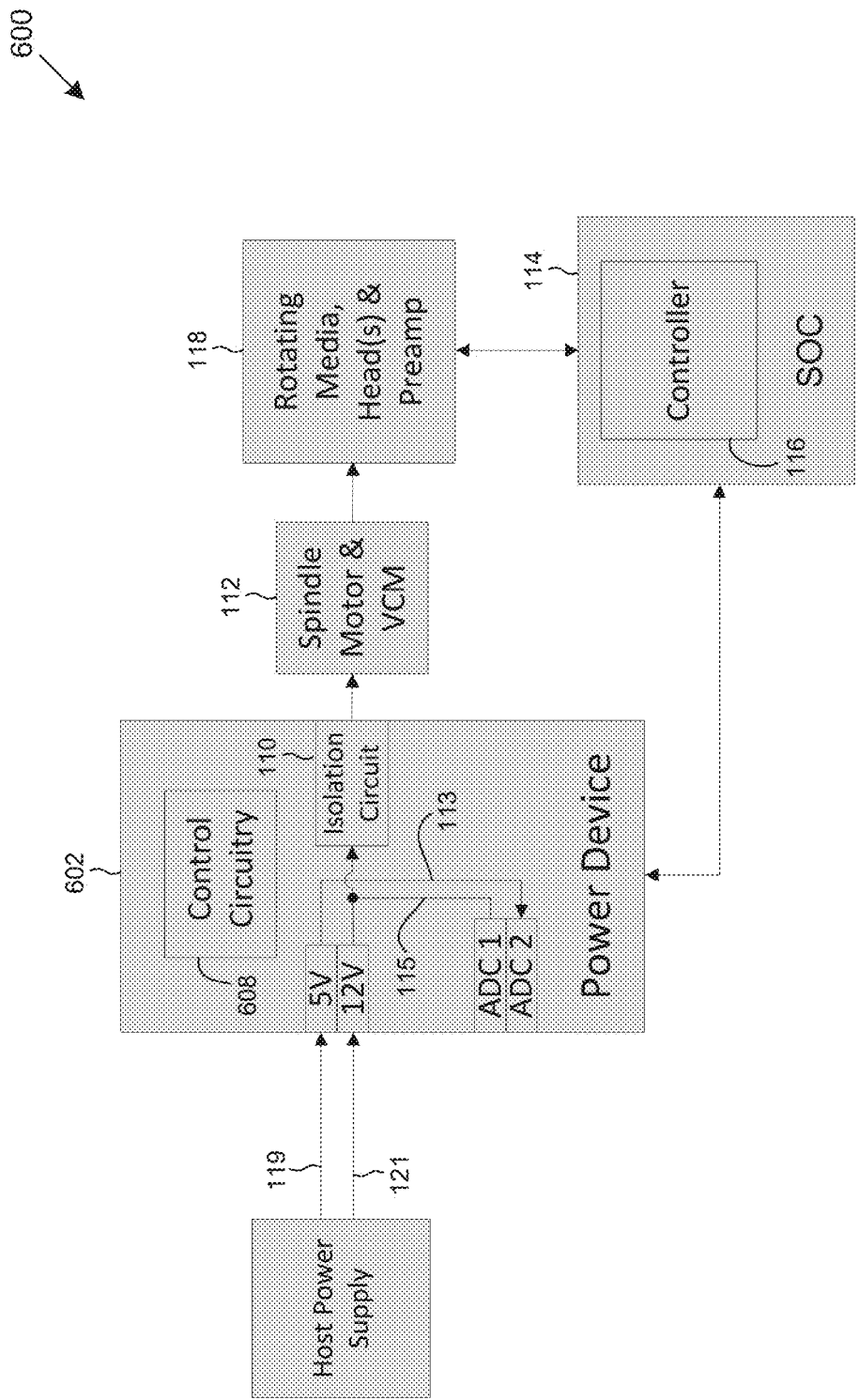
FIG. 6 shows a data storage device according to an embodiment of the invention wherein host low and high voltage supply lines are coupled to a power device in the data storage device and a high voltage isolation circuit is provided inside the power device.

FIG. 6 shows a data storage device 600 coupled to a host power supply according to an embodiment of the invention. The embodiment of the invention shown in FIG. 6 is similar to the embodiment of the invention shown in FIG. 3, except that the data storage device 600 in FIG. 6 does not include isolation circuit 104, a charge storage element, and backup circuit 106, and power device 602 does not include ADC channel 3. In contrast to the control circuitry 308, during normal operation the control circuitry 608 in FIG. 6 is configured to monitor the host low and high supply voltages on host supply lines 119 and 121 via ADC channels 2 and 1 at the low and high voltage rails 113 and 115 of the power device 602, respectively.

When the control circuitry 608 detects an overvoltage event on either the low or high voltage host supply line via ADC channels 2 or 1, respectively, the control circuitry 608 is configured to open isolation circuit 110 to isolate the host high supply voltage from the spindle motor and VCM circuitry 112. In an embodiment of the invention, when the isolation circuit 110 is opened, the control circuitry 308 is configured to initiate a VCM retract procedure to move the one or more heads off the rotating media and brake the spindle motor. In one embodiment, the control circuitry 608 is configured to determine whether the overvoltage event has ended and the host low and high supply voltages are at operational levels, and if so, close isolation circuit 110, spin up the rotating media (i.e., one or more disks), return the data storage device 600 to normal operation, and resume monitoring of the low and high voltage host supply lines 119 and 121 as described above.

Figure 7:
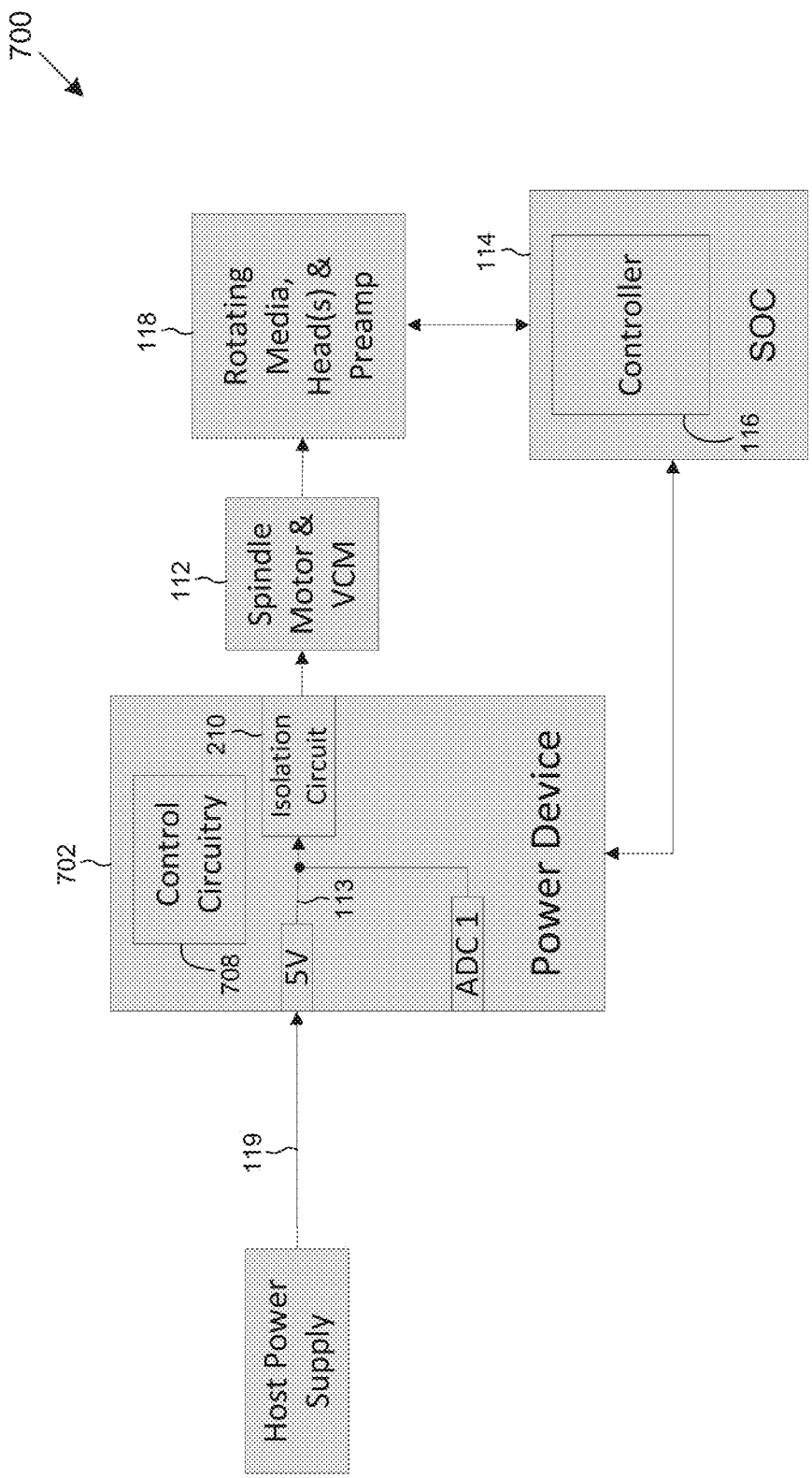
FIG. 7 shows a data storage device according to an embodiment of the invention wherein a host low voltage supply line is coupled to a power device in the data storage device and a low voltage isolation circuit is provided inside the power device.

FIG. 7 shows a data storage device 700 coupled to a host power supply according to an embodiment of the invention. The embodiment of the invention shown in FIG. 7 is similar to the embodiment of the invention shown in FIG. 5, except that the data storage device 700 in FIG. 7 does not include isolation circuit 104 and power device 702 does not include ADC channel 2. In contrast to the control circuitry 508 in the embodiment in FIG. 5, during normal operation the control circuitry 708 in FIG. 7 is configured to monitor the host low supply voltage on host supply line 119 via ADC channel 1 on the low voltage power rail 113 in the power device 702.

When an overvoltage event is detected (i.e., when the host low voltage supply rises above a predetermined threshold), the control circuitry 708 is configured to control (i.e., open) isolation circuit 210 situated inside the power device 702 to disconnect the spindle motor and VCM circuitry 112 from the low voltage rail 113, thereby protecting them from the overvoltage event. During the overvoltage event, in an embodiment of the invention, the control circuitry 708 is also configured to initiate a VCM retraction procedure to move the one or more heads off the rotating media (park the heads) and brake the spindle motor. In one embodiment, the control circuitry 708 is configured to determine whether the overvoltage event is over and the host low supply voltage is at an operational level, and if so, close isolation circuit 210, spin up the rotating media (i.e., one or more disks), return the data storage device 700 to normal operation, and resume monitoring of the host low voltage supply line 119 as described above in the embodiment of the invention shown in FIG. 2.

Figure 8:
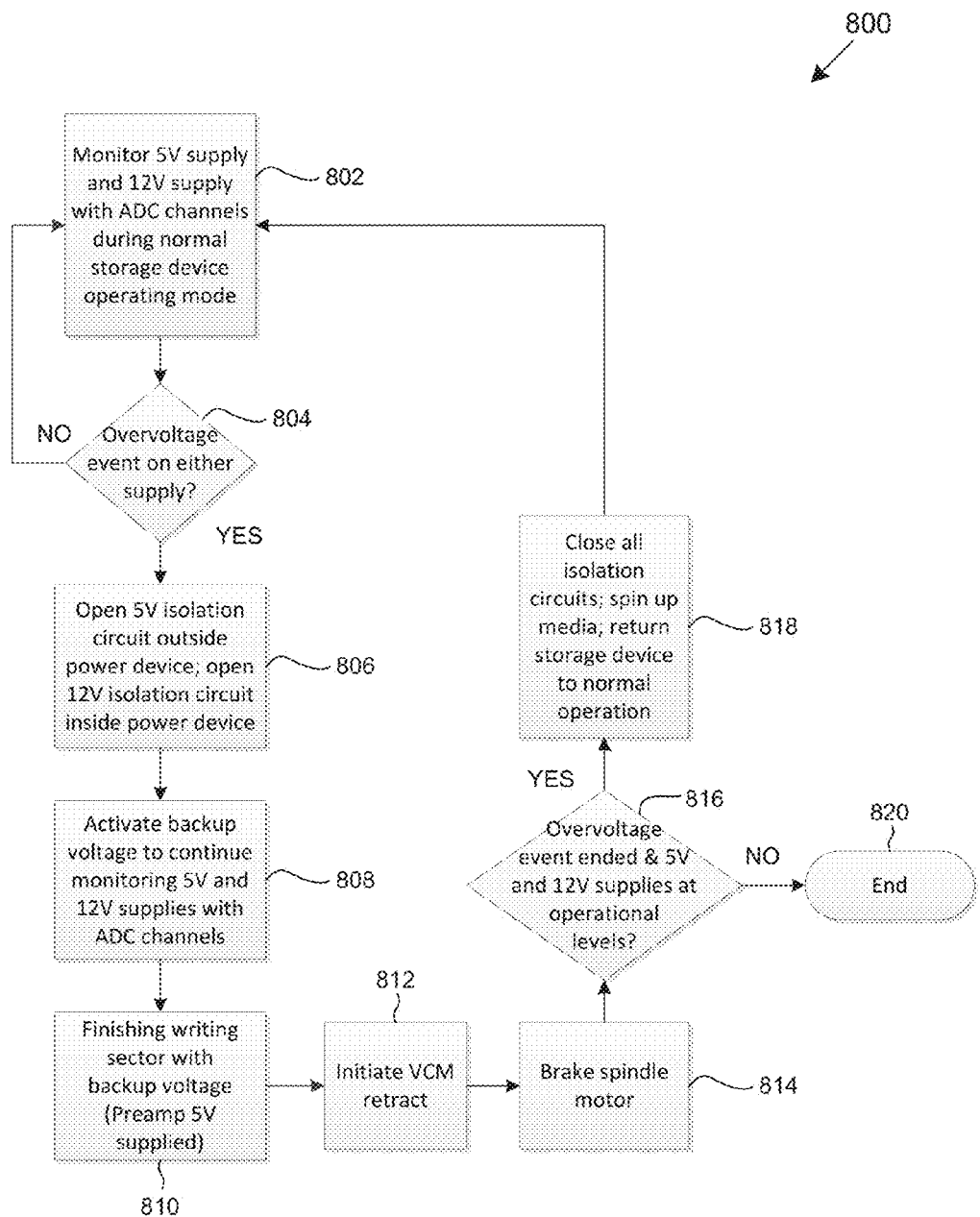
FIG. 8 is a flow diagram according to an embodiment of the invention wherein isolation circuits in host low and high voltage supply lines coupled to a power device in a data storage device and a high voltage isolation circuit inside the power device are opened when an overvoltage event is detected by control circuitry in the power device.

FIG. 8 is a flow diagram 800 executed by control circuitry in a power device in a data storage device according to an embodiment of the invention. Flow diagram 800 may be executed by the control circuitry 108 in power device 102 in data storage device 100 (FIG. 1) or the control circuitry 308 in power device 302 in data storage device 300 (FIG. 3), for example. During normal data storage device operation, the control circuitry monitors the low (e.g., 5V) and high (e.g., 12V) host supply lines with respective ADC channels in the power device (block 802). When an overvoltage event is detected on either the low or high voltage host supply line (block 804), the control circuitry opens the low voltage isolation circuit outside the power device and the high voltage isolation circuit inside the power device (block 806), activates a backup voltage to enable the control circuitry to continue to monitor the low (e.g., 5V) and high (e.g., 12V) voltage host supply lines and low and high voltage power rails with respective ADC channels inside the power device (block 808). The backup voltage also supplies a low voltage (e.g., 5V) to the preamp and the SOC to enable a controller in the SOC to finish any on-going writing of data to a sector on the media (810), enable the control circuitry to initiate a VCM retract procedure to move the heads off the media (park the heads) (block 812) and brake the spindle motor (block 814). If the control circuitry determines that the overvoltage event has ended and the low and high supply voltages are at operational levels (block 816), the control circuitry closes all isolation circuits, spins up the rotating media (i.e., one or more disks), returns the data storage device to normal operation (block 818), and resumes monitoring the low and high voltage host supply lines (block 802). Otherwise, the process ends (block 820).

Figure 9:
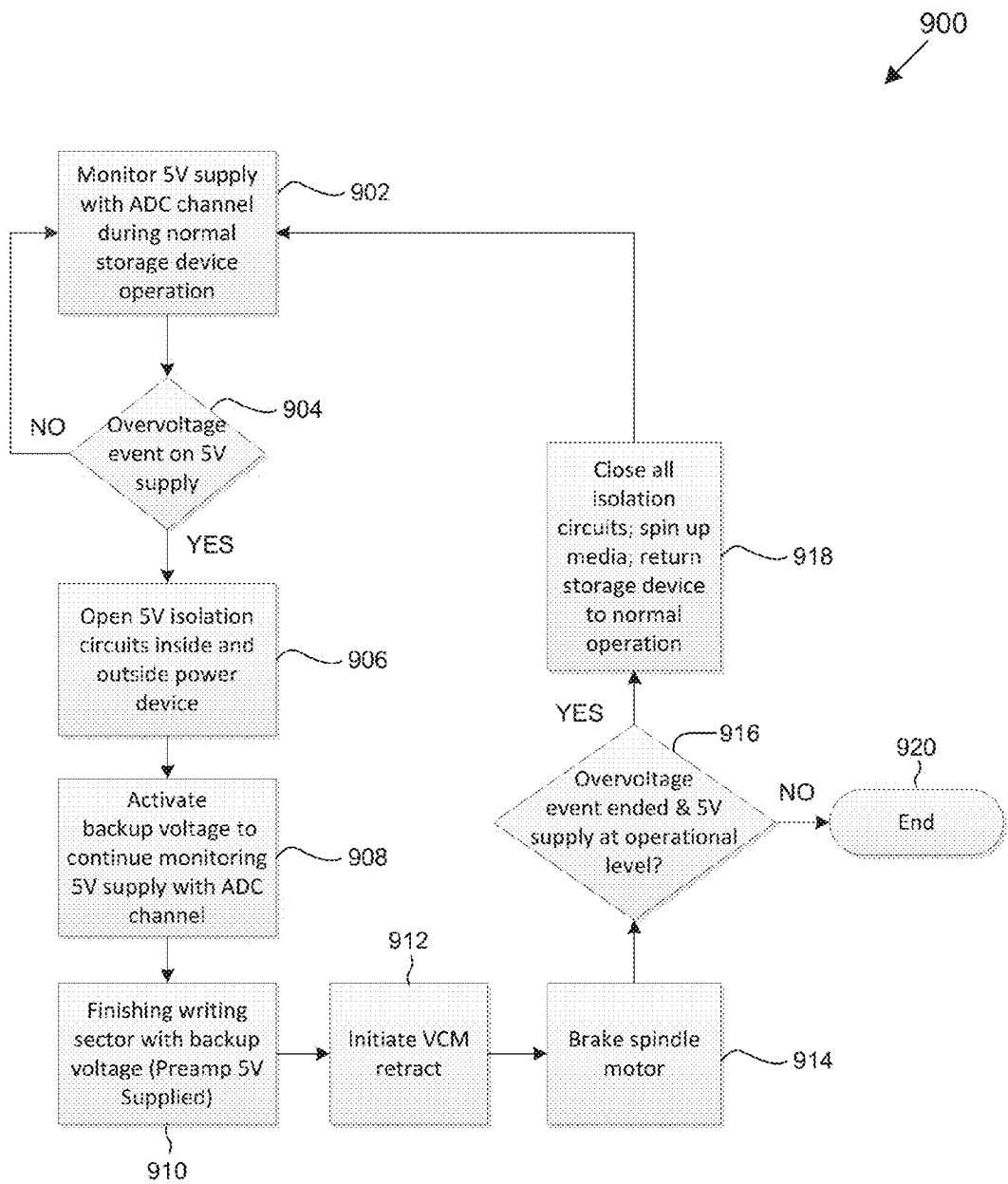
FIG. 9 is a flow diagram according to an embodiment of the invention wherein an isolation circuit in a host low voltage supply line coupled to a power device in a data storage device and a low voltage isolation circuit inside the power device are opened when an overvoltage event is detected by control circuitry in the power device.

FIG. 9 is a flow diagram 900 executed by control circuitry in a power device in a data storage device according to an embodiment of the invention. Flow diagram 900 in FIG. 9 may be executed by the control circuitry 208 in power device 202 in data storage device 200 (FIG. 2), for example. During normal data storage device operation, the control circuitry monitors the low (e.g., 5V) host supply line with an ADC channel in the power device (block 902). When an overvoltage event is detected (block 904), the control circuitry opens the low voltage isolation circuit situated outside the power device in the low voltage host supply line and the low voltage isolation circuit situated inside the power device (block 906), and activates a backup voltage to enable the control circuitry to continue to monitor the host low supply voltage via an ADC channel inside the power device (block 908). The backup voltage also supplies a low voltage (e.g., 5V) to the preamp and the SOC to enable a controller in the SOC to finish any on-going writing of data to a sector on the rotating media (e.g., one or more disks in the data storage device) (block 910), and enable the control circuitry to initiate a VCM retract procedure to move the one or more heads off the media (park the heads) (block 912) and brake the spindle motor (block 914).

If the control circuitry determines that the overvoltage event has ended and the host low (e.g., 5V) supply voltage is at an operational level (block 916), the control circuitry closes all isolation circuits, spins up the rotating media (i.e., one or more disks), returns the data storage device to normal operation (block 918), and resumes monitoring the host low voltage supply line (block 902). Otherwise, the process ends (block 920).

Figure 10:
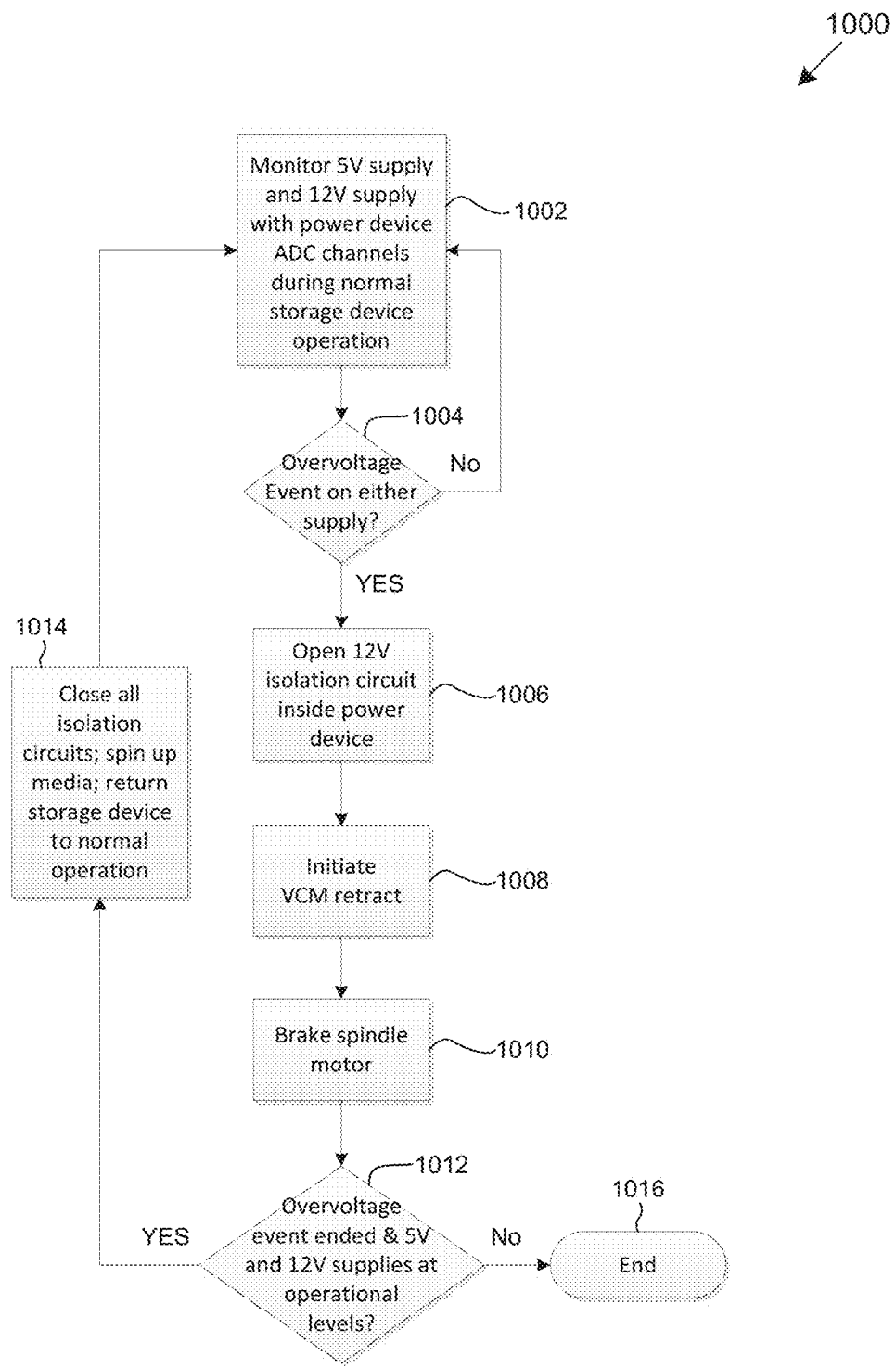
FIG. 10 is a flow diagram according to an embodiment of the invention wherein a high voltage isolation circuit inside a power device in a data storage device is opened when an overvoltage event is detected by control circuitry in the power device.

FIG. 10 is a flow diagram 1000 executed by control circuitry in a power device in a data storage device according to an embodiment of the invention. Flow diagram 1000 in FIG. 10 may be executed by the control circuitry 408 in power device 402 in data store device 400 (FIG. 4), or control circuitry 608 in power device 602 in data storage device 600 (FIG. 6), for example. During normal data storage device operation, the control circuitry monitors the low (e.g., 5V) and high (e.g., 12V) voltage host supply lines with respective ADC channels in the power device (block 1002). When an overvoltage event is detected on the low or high voltage host supply line (block 1004), the control circuitry opens the high voltage isolation circuit inside the power device (block 1006). During the overvoltage event, control circuitry initiates a VCM retract procedure to move the heads off the media (park the heads) (block 1008) and brake the spindle motor (block 1010). If the control circuitry determines that the overvoltage event has ended and the host low and high supply voltages are at operational levels (block 1012), the control circuitry closes all isolation circuits, spins up the rotating media (i.e., one or more disks), returns the data storage device to normal operation (block 1014), and resumes monitoring the host low and high voltage supply lines (block 1002). Otherwise, the process ends (block 1016).

Figure 11:
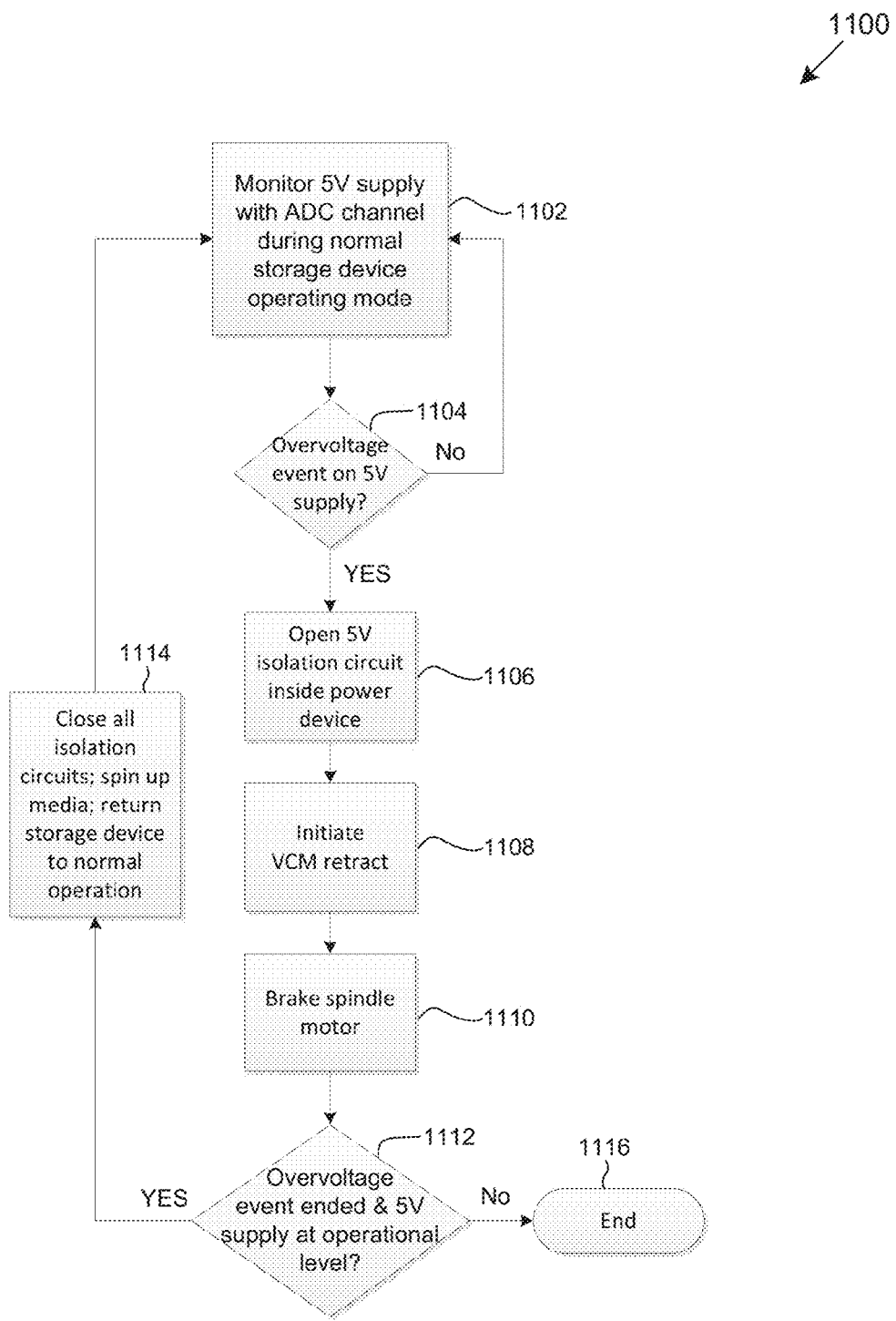
FIG. 11 is a flow diagram according to an embodiment of the invention wherein a low voltage isolation circuit inside a power device in a data storage device is opened when an overvoltage event is detected by control circuitry in the power device.

FIG. 11 is a flow diagram 1100 executed by control circuitry in a power device in a data storage device according to an embodiment of the invention. Flow diagram 1100 in FIG. 11 may be executed by the control circuitry 508 in power device 502 in data storage device 500 (FIG. 5) or control circuitry 708 in power device 702 in data storage device 700 (FIG. 7), for example. During normal data storage device operation, the control circuitry monitors the low (e.g., 5V) host supply line with an ADC channel in the power device (block 1102). When an overvoltage event is detected (block 1104), the control circuitry opens the low voltage isolation circuit situated inside the power device (block 1106), initiates a VCM retract procedure to move the heads off the media (park the heads) (block 1108) and brakes the spindle motor (block 1110). If the control circuitry determines that the overvoltage event has ended and the host low supply voltage is at an operational level (block 112), the control circuitry closes all isolation circuits, spins up the rotating media (i.e., one or more disks), returns the data storage device to normal operation (block 1114), and resumes monitoring of the host low voltage supply line (block 1102). Otherwise, the process ends (block 1116).

In an embodiment, the data storage device may be a solid state drive (SSD). An embodiment in which the data storage device is an SSD may correspond to embodiments of the invention shown in FIG. 2, 5, 7, 9 or 11, for example, wherein the spindle motor and VCM circuitry block referred to in those embodiments is replaced by a non-volatile semiconductor memory (NVSM) array comprising, for example, one or more NAND flash devices or other type of NVSM device. Also, in an embodiment in which the data storage device is an SSD, there are no moving parts (the media is NVSM). Therefore, operations such as "initiate VCM retract", "brake spindle motor", or "spin up media" referred to in the embodiments shown in FIG. 2, 5, 7, 9, or 11 do not apply.

It is noted that the blocks (i.e., steps) in the flow diagrams in FIGS. 8-11 are shown in a particular order to illustrate respective embodiments of the invention. In other embodiments, the blocks in the flow diagrams in FIGS. 8-11 may be performed in a different order.

While some embodiments of the invention have been described, these embodiments have been presented by way of example only, and are not intended to limit the scope of the inventions. Indeed, the novel methods and devices described herein may be embodied in a variety of other forms. Furthermore, various omissions, substitutions and changes in the form of the methods and devices described herein may be made without departing from the spirit of the inventions. For example, the various components described may be implemented as software and/or firmware on a processor, ASIC/FPGA, or dedicated hardware. For example, those skilled in the art will appreciate that in some embodiments, the actual steps taken in the processes of some embodiments may differ from those shown in the figures. Depending on the embodiment, certain of the steps described in the example above may be removed, others may be added, and the sequence of steps may be altered and/or performed in parallel.

Also, the features and attributes of the specific embodiments disclosed above may be combined in different ways to form additional embodiments, all of which fall within the scope of the present disclosure. Although certain embodiments have been disclosed, other embodiments that are apparent to those of ordinary skill in the art, including embodiments which do not provide all of the features and advantages set forth herein, are also within the scope of this disclosure. Accordingly, the scope of protection is defined only by the claims.

What is claimed is:

1. A data storage device comprising:
   spindle motor circuitry;
   Voice Coil Motor (VCM) circuitry;
   a power device coupled to a host power supply via first and second host supply lines and coupled to the spindle motor circuitry and the VCM circuitry, the power device comprising:

first and second voltage rails;
a first isolation circuit; and
control circuitry;
a second isolation circuit coupled to the second host supply line between the host power supply and the power device; and
a third isolation circuit coupled to the first host supply line between the host power supply and the power device;
wherein the power device is operable to receive a first supply voltage on the first voltage rail via the first host supply line and provide the first supply voltage to the spindle motor circuitry and the VCM circuitry via the first isolation circuit; and
wherein the control circuitry is further operable to:
monitor the first and second host supply lines for an overvoltage event; and
when the overvoltage event is detected:
control the first isolation circuit to disconnect the spindle motor circuitry and the VCM circuitry from the first voltage rail;
control the second isolation circuit to disconnect the second host supply line from the power device; and
control the third isolation circuit to disconnect the first host supply line from the power device.

2. The data storage device as recited in claim 1, wherein the power device further comprises an Analog to Digital Converter (ADC) channel, and wherein the control circuitry is further operable to monitor the first voltage rail via the ADC channel.

3. The data storage device as recited in claim 1, wherein the power device further comprises an ADC channel, and wherein the control circuitry is further operable to monitor the first host supply line via the ADC channel.

4. The data storage device as recited in claim 1, further comprising a charge storage element coupled to a backup circuit, wherein the backup circuit is coupled to the second voltage rail, and wherein the control circuitry is further operable to control the backup circuit to provide a backup voltage to the power device when the first host supply line is disconnected from the power device.

5. The data storage device as recited in claim 4, wherein the power device further comprises a boost switching regulator operable to charge the charge storage element to the backup voltage.

6. The data storage device as recited in claim 4, wherein the backup voltage enables the control circuitry to continue to monitor the first host supply line and the first voltage rail after detection of the overvoltage event.

7. The data storage device as recited in claim 4, further comprising rotating media and one or more heads, wherein the backup voltage enables the control circuitry to initiate a VCM retract procedure to move the one or more heads off the rotating media.

8. The data storage device as recited in claim 4, further comprising a controller coupled to the power device, wherein the control circuitry is further operable to notify the controller that the overvoltage event has occurred.

9. The data storage device as recited in claim 4, wherein the control circuitry is further operable to, after determining that the overvoltage event has ended and the first supply voltage is at an operational level:
control the first isolation circuit to connect the first voltage rail to the spindle motor circuitry and the VCM circuitry; and
control the second isolation circuit to connect the second host supply line to the power device.

10. A data storage device comprising:
spindle motor circuitry;
Voice Coil Motor (VCM) circuitry; and
a power device coupled to a host power supply via first and second host supply lines and coupled to the spindle motor circuitry and the VCM circuitry, the power device comprising:
first and second voltage rails;
a first isolation circuit; and
control circuitry;
a second isolation circuit coupled to the second host supply line between the host power supply and the power device; and
a third isolation circuit coupled to the first host supply line between the host power supply and the power device;
wherein the power device is operable to receive a first supply voltage on the first voltage rail via the first host supply line and a second supply voltage on the second voltage rail via the second host supply line and provide the first supply voltage to the spindle motor circuitry and the VCM circuitry via the first isolation circuit;
wherein the control circuitry is further operable to:
monitor the first and second voltage rails for an overvoltage event; and
when the overvoltage event is detected:
control the first isolation circuit to disconnect the spindle motor circuitry and the VCM circuitry from the first voltage rail;
control the second isolation circuit to disconnect the second host supply line from the power device; and
control the third isolation circuit to disconnect the first host supply line from the power device.

11. The data storage device as recited in claim 10, wherein the power device further comprises first and second ADC channels, and wherein the control circuitry is further operable to monitor the first voltage rail via the first ADC channel and the second voltage rail via the second ADC channel.

12. The data storage device as recited in claim 10, wherein the power device further comprises an ADC channel, and wherein the control circuitry is further operable to monitor the second host supply line via the ADC channel.

13. The data storage device as recited in claim 10, further comprising a charge storage element coupled to a backup circuit, wherein the backup circuit is coupled to the second voltage rail, and wherein the control circuitry is further operable to control the backup circuit to provide a backup voltage on the second voltage rail when the second host supply line is disconnected from the power device and the spindle motor circuitry and the VCM circuitry are disconnected from the first voltage rail.

14. The data storage device as recited in claim 13, wherein the power device further comprises a boost switching regulator operable to charge the charge storage element to the backup voltage.

15. The data storage device as recited in claim 10, wherein the power device further comprises an ADC channel, and wherein the control circuitry is operable to monitor the first host supply line via the ADC channel.

16. The data storage device as recited in claim 13, wherein the backup voltage enables the control circuitry to continue to monitor the first and second host supply lines and the first and second voltage rails after detection of the overvoltage event.

17. The data storage device as recited in claim 13, further comprising rotating media and one or more heads, wherein the backup voltage enables the control circuitry to initiate a VCM retract procedure to move the one or more heads off the rotating media and brake a spindle motor associated with the spindle motor circuitry.

18. The data storage device as recited in claim 10, further comprising a controller coupled to the power device, wherein the control circuitry is further operable to notify the controller that the overvoltage event has been detected.

19. The data storage device as recited in claim 10, wherein the control circuitry is further operable to, after determining that the overvoltage event has ended and the first and second supply voltages are at respective operational levels:
    control the first isolation circuit to connect the first voltage rail to the spindle motor circuitry and the VCM circuitry;
    control the second isolation circuit to connect the second host supply line to the power device; and
    control the third isolation circuit to connect the first host supply line to the power device.

20. The data storage device as recited in claim 10, wherein the first supply voltage is greater than the second supply voltage.

21. A method of operating a data storage device, the data storage device coupled to a host power supply and comprising:
    spindle motor circuitry;
    VCM circuitry;
    a power device coupled to the host power supply via first and second host supply lines and coupled to the spindle motor circuitry and the VCM circuitry, the power device comprising:
        first and second voltage rails;
        a first isolation circuit; and
        control circuitry;
    a second isolation circuit coupled to the second host supply line between the host power supply and the power device; and
    a third isolation circuit coupled to the first host supply line between the host power supply and the power device;
    wherein the power device is configured to receive a first supply voltage on the first voltage rail via the first host supply line and provide the first supply voltage to the spindle motor circuitry and the VCM circuitry via the first isolation circuit;
    the method comprising:
        monitoring the first voltage rail for an overvoltage event; and
        when the overvoltage event is detected:
            controlling the first isolation circuit to disconnect the spindle motor circuitry and the VCM circuitry from the first voltage rail;
            controlling the second isolation circuit to disconnect the second host supply line from the power device; and
            controlling the third isolation circuit to disconnect the first host supply line from the power device.

22. The method as recited in claim 21, wherein the power device further comprises an ADC channel, the method further comprising monitoring the first voltage rail via the ADC channel.

23. The method as recited in claim 21, wherein the power device further comprises an ADC channel, the method further comprising monitoring the first host supply line via the ADC channel.

24. The method as recited in claim 21, wherein the data storage device further comprises a charge storage element coupled to a backup circuit, and wherein the backup circuit is coupled to the second voltage rail, the method further comprising controlling the backup circuit to provide a backup voltage on the second voltage rail when the first host supply line is disconnected from the power device.

25. The method as recited in claim 24, wherein the power device further comprises a boost switching regulator, further comprising using the boost switching regulator to charge the charge storage element to the backup voltage.

26. The method as recited in claim 24, further comprising continuing to monitor the first host supply line and the first voltage rail after detection of the overvoltage event by using the backup voltage to enable the control circuitry.

27. The method as recited in claim 24, wherein the data storage device further comprises rotating media and one or more heads, the method further comprising initiating a VCM retract procedure to move the one or more heads off the rotating media by using the backup voltage to enable the control circuitry.

28. The method as recited in claim 24, wherein the data storage device further comprises a controller coupled to the power device, the method further comprising notifying the controller that the overvoltage event has occurred.

29. The method as recited in claim 24, further comprising, after determining that the overvoltage event has ended and the first supply voltage is at an operational level:
    controlling the first isolation circuit to connect the first voltage rail to the spindle motor circuitry and the VCM circuitry; and
    controlling the second isolation circuit to connect the second host supply line to the power device.

30. A method of operating a data storage device, the data storage device comprising:
    spindle motor circuitry;
    VCM circuitry;
    a power device coupled to a host power supply via first and second host supply lines and coupled to the spindle motor and VCM circuitry, the power device comprising:
        first and second voltage rails;
        a first isolation circuit; and
        control circuitry;
    a second isolation circuit coupled to the second host supply line between the host power supply and the power device; and
    a third isolation circuit coupled to the first host supply line between the host power supply and the power device;
    wherein the power device is operable to receive a first supply voltage on the first voltage rail via the first host supply line and a second supply voltage on the second voltage rail via the second host supply line and provide the first supply voltage to the spindle motor circuitry and the VCM circuitry via the first isolation circuit;
    the method comprising:
        monitoring the first host supply line for an overvoltage event; and
        when the overvoltage event is detected:
            controlling the first isolation circuit to disconnect the spindle motor circuitry and the VCM circuitry from the first voltage rail;
            controlling the second isolation circuit to disconnect the second host supply line from the power device; and
            controlling the third isolation circuit to disconnect the first host supply line from the power device.

31. The method as recited in claim 30, wherein the power device further comprises first and second ADC channels, the method further comprising monitoring the first voltage rail via the first ADC channel and the second voltage rail via the second ADC channel.

32. The method as recited in claim 30, wherein the power device further comprises an ADC channel, further comprising monitoring the second host supply line via the ADC channel.

33. The method as recited in claim 30, wherein the data storage device further comprises a charge storage element coupled to a backup circuit, wherein the backup circuit is coupled to the second voltage rail, the method further comprising controlling the backup circuit to provide a backup voltage on the second voltage rail when the spindle motor circuitry and the VCM circuitry are disconnected from the first voltage rail.

34. The method as recited in claim 33, wherein the power device further comprises a boost switching regulator, further comprising using the boost switching regulator to charge the charge storage element to the backup voltage.

35. The method as recited in claim 30, wherein the power device further comprises an ADC channel, the method further comprising monitoring the first host supply line via the ADC channel.

36. The method as recited in claim 33, further comprising continuing to monitor the first and second host supply lines and the first and second voltage rails after detection of the overvoltage event by using the backup voltage to enable the control circuitry.

37. The method as recited in claim 33, wherein the data storage device further comprises rotating media and one or more heads, further comprising initiating a VCM retract procedure to move the one or more heads off the rotating media and braking the spindle motor by enabling the control circuitry by using the backup voltage to enable the control circuitry.

38. The method as recited in claim 30, wherein the data storage device further comprises a controller coupled to the power device, the method further comprising notifying the controller that a power fail condition has occurred when the overvoltage event is detected.

39. The method as recited in claim 30, further comprising, after determining that the overvoltage event has ended and the first supply voltage is at an operational level:
   controlling the first isolation circuit to connect the first voltage rail to the spindle motor circuitry and the VCM circuitry;
   controlling the second isolation circuit to connect the second host supply line to the power device; and
   controlling the third isolation circuit to connect the first host supply line to the power device.

40. The method as recited in claim 30, wherein the first supply voltage is greater than the second supply voltage.

\* \* \* \* \*